United States Patent [19]

Kleppen

[11] Patent Number: 4,788,401

[45] Date of Patent: Nov. 29, 1988

[54] INERT GAS WELDING TORCH

[75] Inventor: Arthur L. Kleppen, Kent, Wash.

[73] Assignee: C-K Systematics, Inc. div. of Conley & Kleppen, Int'l., Auburn, Wash.

[21] Appl. No.: 85,556

[22] Filed: Aug. 17, 1987

[51] Int. Cl.[4] .............................................. B23K 9/16
[52] U.S. Cl. ................................. 219/75; 219/137.42
[58] Field of Search ................ 219/70, 74, 75, 137.42, 219/137.41

[56] References Cited

U.S. PATENT DOCUMENTS

| | | | |
|---|---|---|---|
| 3,521,023 | 7/1970 | Dahlman et al. | 219/75 |
| 3,609,282 | 9/1971 | Trattner et al. | 219/75 |
| 4,145,595 | 3/1979 | Keller et al. | 219/75 |
| 4,275,284 | 6/1981 | Conley | 219/75 X |
| 4,300,034 | 11/1981 | Schneider et al. | 219/75 |
| 4,354,088 | 10/1982 | Rehrig | 219/75 |

Primary Examiner—Clifford C. Shaw
Attorney, Agent, or Firm—Keith D. Gehr

[57] ABSTRACT

The present invention is a tungsten inert gas or similar welding torch which is readily adjustable in length for different welding situations. The torch has a relatively conventional head with a heat shield attached at the lower end. The heat shield serves as a resilient telescopic mounting for the gas cup which surrounds the electrode. It further serves to give thermal and mechanical isolation between the torch head and gas cup. A gas diffusion screen pack is located within and bears against an inner circumference of the gas cup to provide resilient support and center the cup about the longitudinal axis of the electrode. The gas cup may be extended or retracted a limited distance within the heat shield and may also be rotated if desired. Alternatively, longer or shorter electrode collet bodies can be screwed into the head to provide almost unlimited adjustment of torch length. A gas cup of appropriate length is used with each collet body.

12 Claims, 2 Drawing Sheets

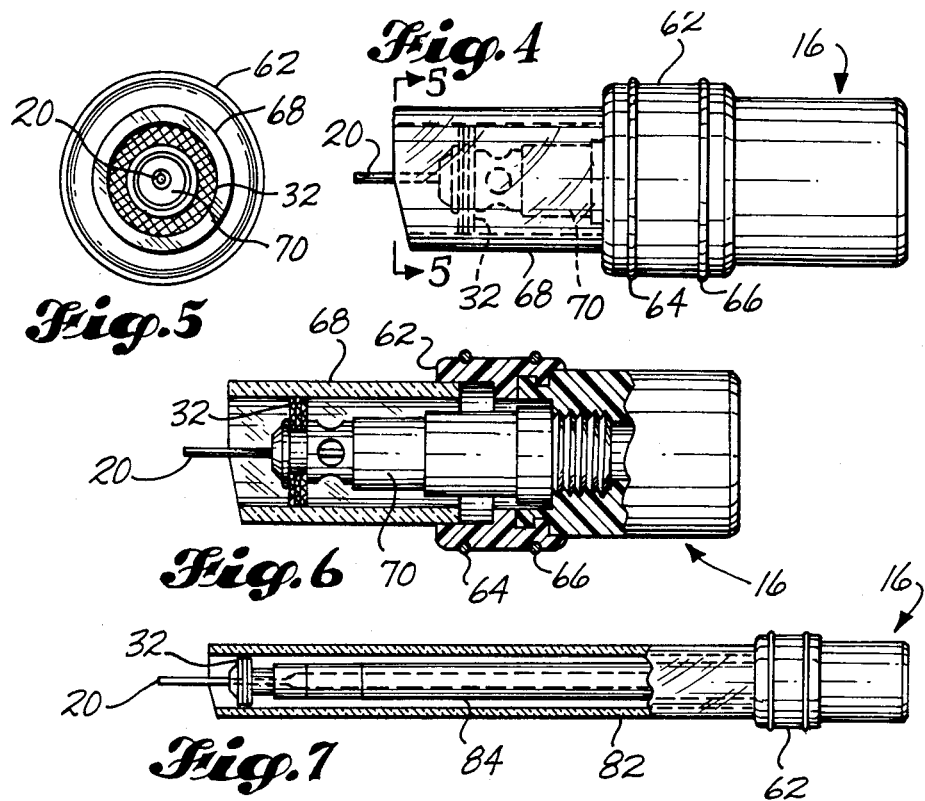
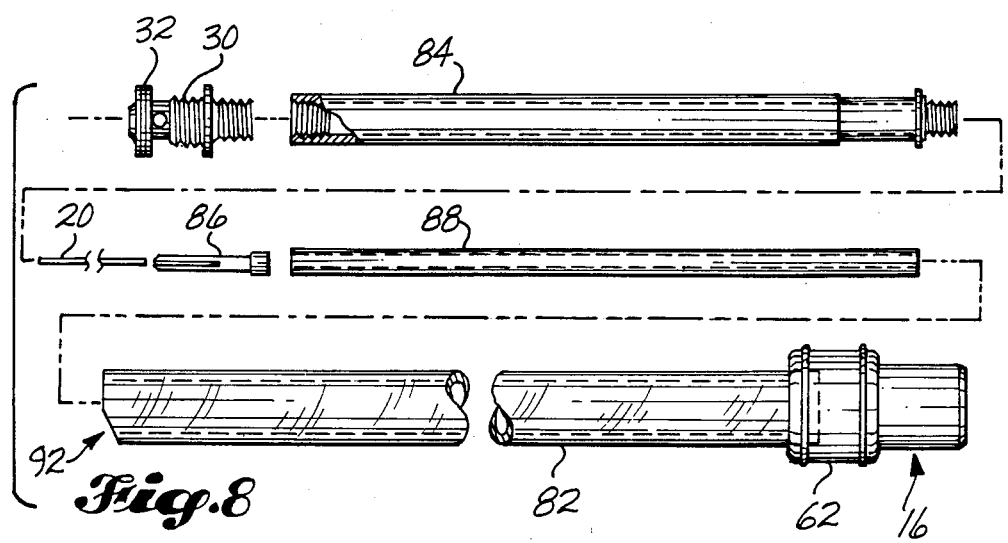

INERT GAS WELDING TORCH

BACKGROUND OF THE INVENTION

The present invention is in the field of tungsten inert gas or similar type welding torches.

Inert gas shielded welding torches have been in common use for over four decades. These employ a fixed or consummable metal electrode contained within a torch head constructed so that the welding zone is surrounded by a blanket of an inert gas. The gases most normally used are helium and argon. Welding torches of this type are used especially with metals that are highly sensitive to oxidation. Aluminum is perhaps the most common of these metals but the method is critical for more exotic materials such as titanium and zirconium. Similarly, plasma torches employ a jet of extremely hot ionized gas to cause fusion in the weld zone. Once again, it is standard practice for the weld area to be blanketed with an inert gas to prevent oxidation.

In similar fashion to conventional arc welding, inert gas shielded torches employ high electrical currents at relatively low voltages. They tend to be rather small and compact in comparison to the rather bulky welding rod holders used for conventional arc welding.

Tungsten inert gas welding torches most typically have a metallic head portion with a side arm attached to the head at approximately a right angle. Very frequently the head will be water cooled. Water inlet and return lines as well as an inert gas supply line are usually contained within the side arm. These lines further act as an electrical conductor to the tungsten electrode held within the head. Both the head and side arms are covered with an electrical and thermal insulating material which is usually a molded phenolic resin or silicone rubber compound. The side arm serves as a handle to hold the torch when in use.

The tungsten electrode is usually held in the head by a collet-type arrangement. A heat resistant gas cup may extend from the head around the electrode. This serves to place the active tip of the electrode at some distance from the body portion of the head so that the welder has better visibility of the weld zone. Gas cups are usually made of a heat resistant ceramic material such as silicon carbide or aluminum oxide. They are secured to the head by a number of arrangements but almost invariably have been fixed in position relative to the head. With but rare exceptions, the end of the gas cup adjacent to weld zone is formed normal to it's longitudinal axis.

As exemplary of prior art welding torches the following United States patents can be mentioned. Hill, in U.S. Pat. Nos. 4,309,588 and 3,180,967, shows tungsten inert gas welding torches in which the gas cup is threaded to the head portion. Anderson, in U.S. Pat. No. 2,512,706, shows a nozzle or gas cup which is held frictionally in a fixed position on the torch head. Reeh, in U.S. Pat. No. 3,548,143, shows a gas cup held on by a retaining nut. The gas cup in Reeh is elongated and has a lateral orifice for welding in places that might otherwise be inaccessable. Klasson, in U.S. Pat. No. 3,794,806, and Sanders et al., in U.S. Pat. No. 3,909,585, show other examples of torches having threaded ceramic gas cups.

Ideally the gas cup serves to deliver a uniform and nonturbulent flow of gas around the weld area. The problem of turbulence within the shielding gas has been poorly recognized and has received little attention. Dahlman et al., in U.S. Pat. No. 3,521,023, show a pack of stacked spaced apart screens at the nozzle area of a plasma torch. This is described as a "gas lens" whose function is said to be diffusion of the inert gas. The Dahlman torch does not employ a gas cup as do all of the previously noted torches. The aforementioned patent to Hill, U.S. Pat. No. 3,180,967, similarly employs a stacked screen pack at various locations in the nozzle portion to establish coherent streaming of the shielding gas for some distance beyond the immediate mouth of the nozzle.

As noted before, the prior art employs gas cups which are in fixed position on the nozzle. This sometimes results in inconvenience to the welder who must often work in situations where the geometry of the materials being welded makes access difficult. At times a shorter or longer nozzle would be useful while at other times it would be convenient to hold the torch at some oblique angle relative to the weld zone. Further, the rigid nozzle or gas cup portion of the torch tends to be relatively fragile and is occasionally broken by unavoidable impacts encountered in the environment in which a welder must work. These are real problems which a welder faces on a day-to-day basis but heretofore they have not been significantly addressed in the prior art.

SUMMARY OF THE INVENTION

The present invention is a tungsten inert gas or similar type welding torch. It comprises a head for holding an electrode and providing a shield of inert gas around the weld zone. The head has upper and lower ends and contains a removable collet body, a collet for gripping a tungsten wire electrode and a collet jam for tightening the electrode in the collet. The torch further has a side arm attached to the head. Inert gas and any other fluid supply lines such as cooling water are contained within the side arm.

One of the novel features of the present invention is a heat shield attached to the lower end of the head. This heat shield serves as a resilient and adjustable mounting sleeve for a gas cup and provides at least some thermal and mechanical isolation between the gas cup and the torch head. A pack of gas diffusion screens is located within the gas cup and bears against an inner circumference of the gas cup. Here it provides additional resilient support and serves to center the cup about the longitudinal axis of the electrode.

In the most preferred embodiments of the invention the collet body extends axially and concentrically into the gas cup and the gas diffusion screens are mounted at the distal end of the collet body. The proximal end of the collet body is threaded into the head so that it is readily replaceable. In this way, longer or shorter collet bodies may be used to readily adjust the length of the torch head. Gas cups of appropriate length are used for each different length of collet. However, the heat shield is constructed so that the gas cup is held in a sliding telescopic friction fit. In this manner minor adjustment for length is readily achieved by the welder without any other modification of the torch.

In one version of the invention the mouth or distal end of the gas cup is beveled at an angle between 5° and 30°, preferably about 15°. This enables the welder to hold the torch at a more comfortable angle with the work being welded without losing the advantage of a laminar inert gas flow around the weld zone.

The gas diffusion screen pack can be mounted near the distal end of the gas cup. At this location it serves particularly well to cushion the cup against sideways impacts. The cup itself is preferably made from a transparent heat resistant glass or glass-like tubing.

It is an object of the present invention to provide a more versatile tungsten inert gas or similar welding torch.

It is another object of the invention to provide a tungsten inert gas torch which can be readily adjusted for length.

It is a further object of the present invention to provide a tungsten inert gas torch having an adjustable and resiliently mounted nozzle or gas cup.

These and many other objects will become readily apparent to those reading the following detailed description taken in conjunction with the drawings.

BRIEF DESCRIPTION OF THE DRAWINGS

FIG. 4 is a side elevation of the head portion of a torch having an alternative construction to that of FIG. 1.

FIG. 5 is a view taken along line 5—5 of FIG. 4.

FIG. 6 is a partial longitudinal cross-sectional view of the torch head of FIG. 4.

FIG. 7 is a side elevation, partially in longitudinal cross section, of an elongated version of a torch head.

FIG. 8 is an exploded side elevation of the component elements of the torch head of FIG. 7.

DESCRIPTION OF THE PREFERRED EMBODIMENTS

Figure 1:
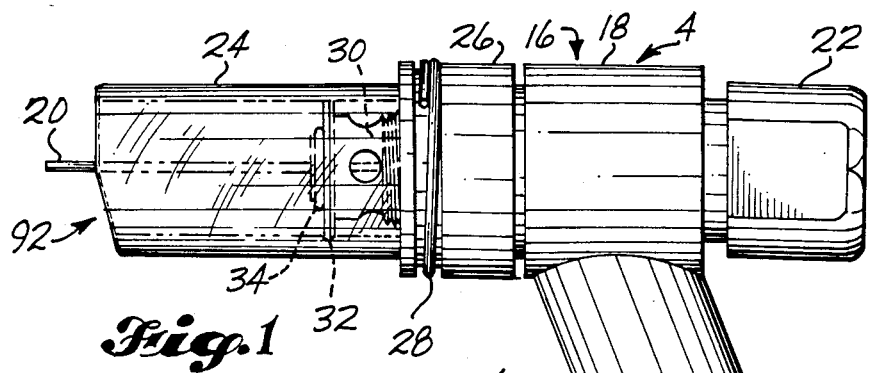
FIG. 1 is a side elevation view of a tungsten inert gas welding torch.
Figure 2:
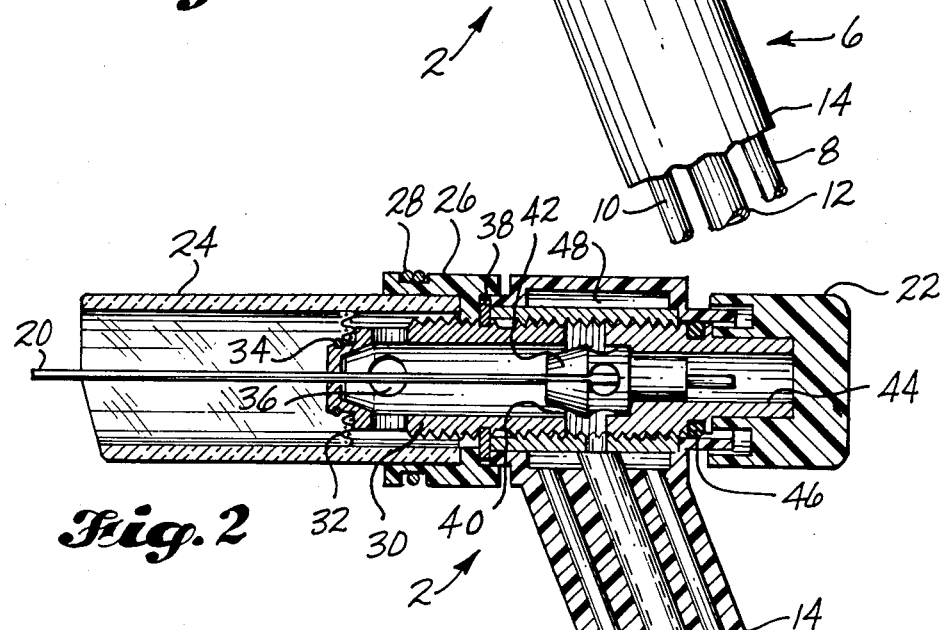
FIG. 2 is a cross section of the torch shown in FIG. 1.
Figure 3:
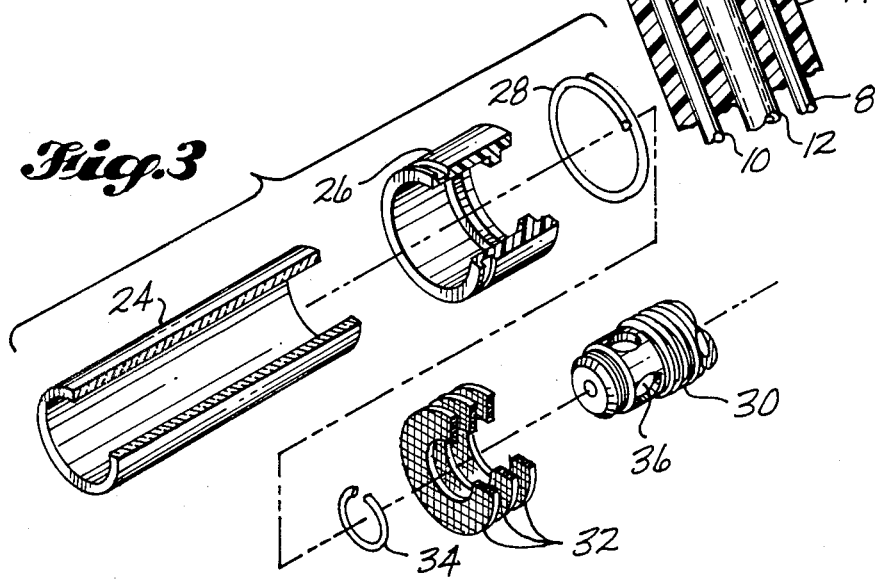
FIG. 3 is an exploded perspective view of the gas cup and gas diffusion elements of the torch.

Reference is now made to the drawings for a description of the best mode presently known for constructing the present invention. In FIGS. 1-3 a tungsten inert gas welding torch is generally shown at 2. This torch has a head portion, generally shown at 4, and a side arm 6, the latter being truncated in the drawings. The side arm carries any fluid supply and/or return lines and also serves as an electrical conductor to the electrode. In the version shown here, tube 8 acts as a cooling water inlet for the torch head while tube 10 serves as a water return line. Tube 12 conducts an inert gas, such as argon or helium to the torch head. These three lines are typically brazed or hard-soldered into a copper or brass header, not shown, for connection to a power source.

Arm 6 is covered with molded-on insulation 14. The main or body portion of head 16 is also covered with an insulating jacket 18, which may be unitary with the insulation 14 on the arm. The insulation is usually either a heat resistant phenolic compound or silicone rubber.

An electrode 20, generally made of tungsten wire, protrudes a short distance from the head and is used to create an arc between the welding torch and the metal being welded.

A small rotatable knob 22 extends from one end of the head and is used for adjusting electrode length and tightening it in a retaining collet. The other end of the head has a gas cup 24 made of a heat resistant material. In the past this has traditionally been an opaque material such as alumina or silicon carbide. In the present torch it is preferably made from a transparent glass or glass-like material such as Pyrex or Vycor glass tubing, or fused silica tubing. Pyrex and Vycor are registered trademarks of Corning Glass Company, Corning, N.Y. Pyrex is a temperature resistant borosilicate glass and Vycor is a high temperature and thermal shock resistant glass containing about 96% silica.

Gas cup 24 is retained in a heat shield 26 fixed to the lower end of the main body 16 of head 4. Heat shield 26 may be made of a ceramic material but preferably is a molded heat-resistant thermoplastic material; e.g., Teflon fluorocarbon polymer. Teflon is a registered trademark of E. I. duPont de Nemours and Company, Wilmington, Del. A compression-type snap or retaining ring 28 holds the gas cup in the heat shield. A similar ring may be used to hold the heat shield to the main portion of torch head 16 or a shallow tongue-and-groove arrangement can be used as is shown in FIG. 2.

Referring now to FIG. 2, the internal construction of the torch head will be described. The interior bore of the torch head is threaded and into this is screwed a collet body 30 having a brazed-on stop ring 38. The distal end of the collet body carries a gas diffusion screen pack 32 held by a retaining clip 34. Orifices 36, in the lower end of the collet body, permit the inert shielding gas to flow out of the collet body from whence it passes through the screens and flows in a generally laminar fashion through gas cup 24 to the weld zone.

A split collet 42 is pressed against the upper end 40 of collet body 30 by a metal insert or collet jam 44 contained within knob 22. This compresses the collet against the electrode where it is firmly retained. An O-ring seal 46 around insert 44 prevents inert gas leakage from the upper portion of the torch head. The torch body is surrounded by a cooling water jacket 48 in order to remove heat transmitted from the weld environment.

The heat shield construction and its associated gas cup form a key part of the present invention. The nonmetallic heat shield helps prevent transfer of heat and mechanical shock from the welding zone to the torch head. In addition, it serves as a resilient telescopic mounting for gas cup 24. The gas cup can be extended or retracted a limited distance, or it can be rotated as desired. This gives an important flexibility to accommodate the geometry of the material being welded. Further, heat shield 26 is able to absorb a considerable amount of impact against gas cup 24 which will help reduce breakage.

As a further feature of the invention, the gas diffusion screen pack 34 bears against an inner circumference of the gas cup. Here it provides additional resilient support and acts further to center the cup about the longitudinal axis of the electrode. To further this end, collet body 30 should preferably extend for some distance axially into the gas cup.

Added flexibility for the welder is achieved by beveling at least a portion of the distal end of the gas cup. This bevel may conveniently be in the range of 5° to 30°, preferably about 15°. It is also prferred that this beveled portion should not extend entirely across the distal end of the gas cup but rather across only a portion of it.

An alternate version of the torch is seen in FIGS. 4-6. This is constructed in generally similar fashion to the version shown in FIGS. 1-3. Here the heat shield 62 has compression-type retaining rings 64-66 which hold it respectively to gas cup 68 and main head portion 16. Gas cup 68 is telescopically mounted in heat shield 62 as before so that it can be extended or retracted and also rotated. In the versions of FIGS. 4-6, collet body 70 is considerably extended over the version shown in FIGS. 1 to 3. This moves the gas diffusion screen pack 32 nearer to the distal end where it is more effective at absorbing impacts against the gas cup and in maintaining the electrode in a centered position.

An even more elongated version of the torch is shown in FIGS. 7 and 8. This version would be used where the welder needed access to an area that could not be conveniently reached by one of the other embodiments just described. This elongated version has a gas cup 82 and a collet body extension 84. Collet body extension 84 may simply be screwed into the main portion of head 16 and collet body 30 moved to the distal end of the extension tube. Electrode 20 is held as before in a somewhat differently configured collet 86. This is tightened against the collet body by a push rod or tube 88 which is forced downward, as before, by knob 22. The elongated gas cup 82 has a beveled end 92 as was shown before.

By constructing the torch in the manner shown it can be quickly modified at the point of use using only the simplest possible tools. Thus, using only a single torch body, the welder has a choice of an almost infinite number of lengths and configurations. This enables welding in deep holes and in other awkward situations that cannot be reached by a conventional torch. The flexibility of the unit is greatly increased over those that are currently available. Other advantages should be noted as well. The use of a transparent gas cup greatly improves the overall visibility of the welder. This cup is supported at both ends against impact shocks which could readily break a cup which was threaded or otherwise rigidly attached to the torch head. The shock absorbing ability is further enhanced by constructing the inert gas diffusion screen pack so that it bears against the inside of the gas cup. Gas flow is maintained more nearly laminar and with less turbulence when the diffusion screen pack is located near the distal end of the gas cup.

It will be evident to those skilled in the art that many variations can be made in the construction of the welding torch just described. It is the intention of the inventor that all such variations should be included wihtin the scope of the invention in so far as they are encompassed by the following claims.

I claim:

1. A tungsten inert gas or similar welding torch which comprises:
   a head means for holding an electrode and providing a shield of inert gas to the weld zone, said head means having upper and lower ends and containing a collet body means, a collet means for gripping the electrode, and a tightening means to tighten the collet means about the electrode;
   a side arm means attached to the head means, said side arm means containing inert gas and any other fluid supply lines and electrical connections and serving as a handle for the torch during use;
   a heat shield means attached to the lower end of the head means;
   gas cup means having a lower end mounted in the heat shield means and a distal end, said heat shield means providing at least some thermal and mechanical isolation between the gas cup means and head means,
   the collet body means extending axially and concentrically into the gas cup means and having mounted thereon a gas diffusion means,
   said gas diffusion means being located within the gas cup means and bearing against an inner circumference of said gas cup means to provide resilient support and center the cup means about the longitudinal axis of the electrode.

2. The welding torch of claim 1 in which the collet body means is elongated so that the gas diffusion means is located proximate the distal end of the gas cup means.

3. The welding torch of claim 1 in which the heat shield means is formed from a heat resistant thermoplastic material.

4. The welding torch of claim 3 in which the gas cup means is resiliently and telescopically mounted in the heat shield means.

5. The welding torch of claim 4 in which only a portion of the distal end of the gas cup is beveled.

6. The welding torch of claim 5 in which the beveled portion of the gas cup is at an angle of about 15°.

7. The welding torch of claim 1 in which the gas cup means is resiliently and telescopically mounted in the heat shield means.

8. The welding torch of claim 1 in which the distal end of the gas cup is beveled at a angle in the range of about 5° to 30°.

9. The welding torch of claim 8 in which the beveled portion of the gas cup is at an angle of about 15°.

10. The welding torch of claim 1 in which the gas cup is essentially cylindrical in shape.

11. The welding torch of claim 1 in which the gas cup is formed from a transparent, heat resistant glass or glass-like material.

12. The welding torch of claim 1 in which the gas diffusion means is a screen pack.

* * * * *